F. SMITH.
SPRING WHEEL.
APPLICATION FILED APR. 11, 1911.
1,017,330.
Patented Feb. 13, 1912.
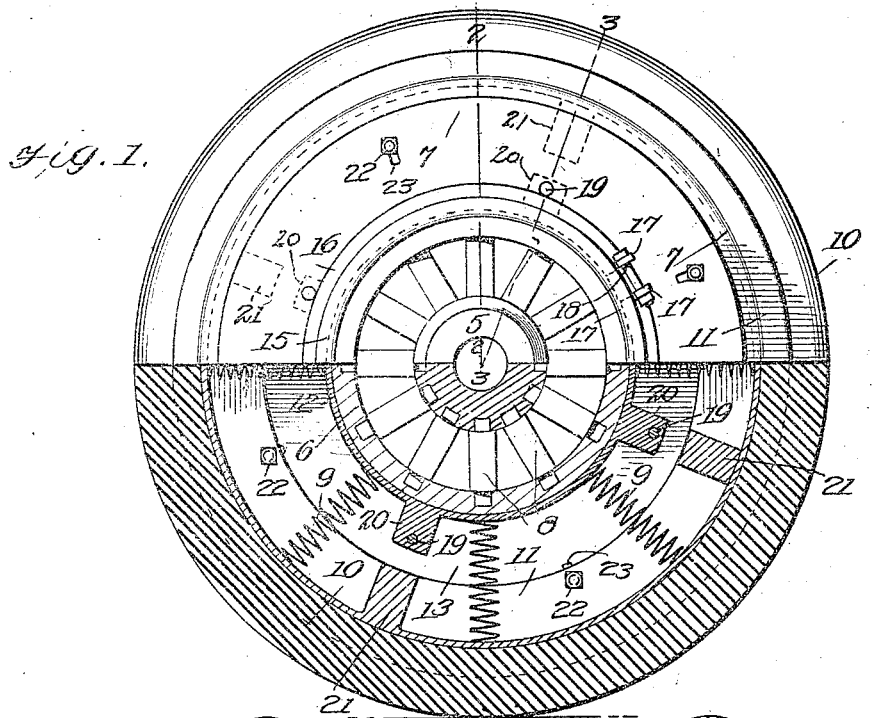
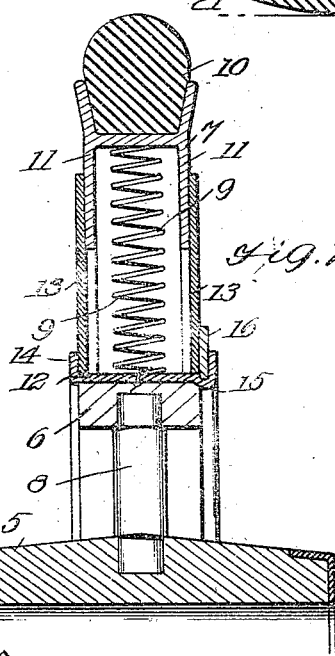
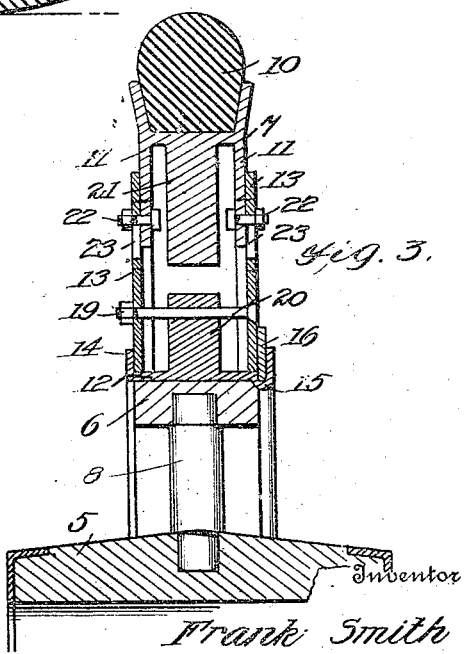
Witnesses
F. C. Barry
Inventor
Frank Smith
By Milo S. Krumbles
Attorneys

UNITED STATES PATENT OFFICE.

FRANK SMITH, OF ROSSVILLE, GEORGIA.

SPRING-WHEEL.

1,017,330.   Specification of Letters Patent.   Patented Feb. 13, 1912.

Application filed April 11, 1911.   Serial No. 620,349.

*To all whom it may concern:*

Be it known that I, FRANK SMITH, a citizen of the United States, residing at Rossville, in the county of Walker and State of Georgia, have invented certain new and useful Improvements in Spring - Wheels, of which the following is a specification.

This invention relates to that class of spring wheels having two rims between which are interposed coiled springs to take up the shocks and vibrations caused by the travel of the wheel over rough roads or obstructions; and it is the object of the invention to provide a wheel of this kind embodying certain novel features of construction to be hereinafter described and claimed, including improved means for holding the parts assembled so that they can be readily disconnected for repairs.

In the accompanying drawing forming a part of this specification, Figure 1 is an elevation, partly broken away, of a wheel constructed in accordance with the present invention. Figs. 2 and 3 are sections on the lines 2—2 and 3—3, respectively, of Fig. 1.

Referring specifically to the drawing, 5 denotes the hub of the wheel. The two rims are indicated at 6 and 7, respectively, these two rims being arranged concentrically. The rim 6, which is the inner one, is rigidly connected to the hub by spokes 8. The outer rim 7 is spaced from the inner rim, and between the two rims are interposed radially arranged coiled springs 9. The outer rim is so arranged with respect to the inner rim that said rims are free to move radially relative to each other. However, relative rotary movement of the rims is prevented by the means to be presently described.

The rim 7 has an outer channel in which is mounted a solid rubber or other tire 10, and from the inner periphery of said rim, on opposite sides thereof, extend annular flanges 11. The space between these flanges forms an annular channel into which the springs 9 extend at one of their ends, said ends engaging the inner periphery of the rim 7. The other ends of the spring engage an annular band 12 encircling the outer periphery of the rim 6, and secured thereto. The ends of the springs are made fast by any suitable means. The rim 6 also serves to support two annular plates 13 serving as mud guards, said plates being located on opposite sides of the wheel. One end of the band 12 has an outstanding flange 14 which extends over the inner edge of one of the plates 13. The other end of the band 12 is bent inwardly along the corresponding side of the rim 6 and thence outwardly to form a channel 15. The plate 13 on this side of the wheel has its inner periphery in engagement with the band 12 and it is held in place by a ring 16 which seats in the channel 15 and is of such a width as to overlap the inner end of the last-mentioned plate 13. The ring is split, and has outstanding ears 17 at its ends through which is threaded a clamping screw 18 for contracting the ring, and thereby locking it in the channel 15. Upon loosening the clamping screw, the ring expands and it may then be removed from the channel, thus releasing the plate 13 so that it may be removed. The plates 13 are connected across by bolts 19 which also pass through lugs 20 on the band 12. The flanges 11 extend with a sliding fit between the plates 13 in order that the herein described relative radial movement of the two rims may take place.

In order to limit the relative radial movement of the two rims, there are located in the channel formed by the flanges 11, lugs 21, said lugs being located opposite the lugs 20. These lugs are adapted to come together when there is an excessive relative movement of the rims, thereby limiting the extent of such movement. The plates 13 are also connected to the flanges 11 by bolts 22, whereby relative rotation of the two rims is prevented. The plates are slotted as indicated at 23 through which the bolts pass, in order that the herein described relative radial movement of the rims may take place.

By the structure herein described, a simple and efficient spring wheel is had which effectually serves the purpose for which it is designed, namely, to take the place of a pneumatic-tire wheel, and the parts are so arranged that they can be readily assembled, which makes the wheel easy to repair.

I claim:

1. A wheel comprising a hub, spaced inner and outer rims, the inner rim being carried by the hub, and the outer rim having annular flanges on its inner periphery, cushioning elements interposed between the rims, and an annular band encircling and secured to the outer periphery of the inner rim, said band having a channel on one side of the inner rim, annular plates encircling the band and closing up the space between the rims, the aforesaid flanges having a sliding engagement with the plates, a loose connection between the plates and the flanges, a split ring seating in the aforesaid channel and engageable with one of the plates, means for contracting said ring in the channel, integral lugs on the band, said lugs being located between the plates, and fastening means passing through the lugs and the plates.

2. A wheel comprising a hub, spaced inner and outer rims, the inner rim being carried by the hub, and the outer rim having annular flanges on its inner periphery, cushioning elements interposed between the rims, an annular band encircling and secured to the inner rim, said band having an outstanding flange on one side and a channel on the other side of the rim, annular plates encircling the band and closing up the space between the rims, the aforesaid annular flanges having a sliding engagement with the plates, and one of said plates being in engagement with the outstanding flange, a split ring seating in the aforesaid channel and engageable with the other one of said plates, means for contracting the ring in the channel, a loose connection between the plates and the annular flanges, integral lugs on the band, said lugs being located between the plates, and fastening means passing through the lugs and the plates.

In testimony whereof I affix my signature in presence of two witnesses.

FRANK SMITH.

Witnesses:
R. A. WEATHERFORD,
L. S. WHITT.